US009120156B2

(12) United States Patent
Hecht

(10) Patent No.: US 9,120,156 B2
(45) Date of Patent: Sep. 1, 2015

(54) RHOMBUS-SHAPED INDEXABLE CUTTING INSERT AND CUTTING TOOL

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 317 days.

(21) Appl. No.: 13/850,961

(22) Filed: Mar. 26, 2013

(65) Prior Publication Data

US 2014/0294525 A1    Oct. 2, 2014

(51) Int. Cl.
*B23B 27/00* (2006.01)
*B23B 27/16* (2006.01)
*B23B 27/14* (2006.01)

(52) U.S. Cl.
CPC ........... *B23B 27/1651* (2013.01); *B23B 27/145* (2013.01); *B23B 27/1611* (2013.01); *B23B 27/1677* (2013.01); *B23B 2200/04* (2013.01); *B23B 2200/0447* (2013.01); *B23B 2200/161* (2013.01); *B23B 2200/3618* (2013.01); *B23B 2200/3627* (2013.01); *B23B 2205/12* (2013.01); *Y10T 407/2272* (2015.01); *Y10T 407/2274* (2015.01); *Y10T 407/23* (2015.01); *Y10T 407/235* (2015.01)

(58) Field of Classification Search
CPC .............. B23B 2205/12; B23B 27/145; B23B 27/1611; B23B 27/1651; B23B 2200/165; B23C 2200/161; B23C 2200/165; B23C 5/207; Y10T 407/2272; Y10T 407/2274; Y10T 407/23; Y10T 407/235
USPC ........................ 407/113, 103, 104, 107, 101
See application file for complete search history.

(56) References Cited

U.S. PATENT DOCUMENTS 1,629,667 A * 5/1927 Knipple .................. 407/103
3,629,919 A * 12/1971 Trevarrow, Jr. ........... 407/103
(Continued)

FOREIGN PATENT DOCUMENTS

DE          3446455 A1 *  6/1986  ............. B23B 27/16
JP     2006255883 A  *  9/2006
(Continued)

OTHER PUBLICATIONS

International Search Report dated Jul. 4, 2014 issued in PCT counterpart application (PCT/IL2014/050236).

*Primary Examiner* — Sunil K Singh
*Assistant Examiner* — Sara Addisu
(74) *Attorney, Agent, or Firm* — Womble Carlyle

(57) ABSTRACT

A rhombus-shaped cutting insert has opposing upper and lower surfaces, and a peripheral side surface extending therebetween having alternating obtuse and acute corner surfaces separated by four relief surfaces. The cutting insert is removably secured in an insert receiving pocket of a tool holder and indexable about a central axis. A nose cutting edge is formed at the intersection of one of the upper and lower surfaces with each of the two acute corner surfaces. One of the upper and lower surfaces has an engagement surface having a single primary and four secondary engagement elements. The primary and secondary engagement elements or portions thereof, exhibit mirror symmetry about primary and secondary engagement planes. The primary engagement plane contains the central axis and intersects each nose cutting edge, and each secondary engagement plane does not contain the central axis and forms an acute engagement angle with the primary engagement plane.

42 Claims, 4 Drawing Sheets

(56) References Cited

U.S. PATENT DOCUMENTS

| | | | | |
|---|---|---|---|---|
| 4,209,047 | A * | 6/1980 | Weill | 144/208.8 |
| 4,315,706 | A * | 2/1982 | Erkfritz | 407/101 |
| 4,709,737 | A * | 12/1987 | Jonsson | 144/241 |
| 5,236,288 | A * | 8/1993 | Flueckiger | 407/36 |
| 5,542,795 | A * | 8/1996 | Mitchell | 407/35 |
| 5,810,518 | A * | 9/1998 | Wiman et al. | 407/102 |
| 5,924,826 | A * | 7/1999 | Bystrom et al. | 407/103 |
| 5,931,613 | A * | 8/1999 | Larsson | 407/103 |
| 6,024,519 | A * | 2/2000 | Okui et al. | 407/113 |
| 6,168,356 | B1 * | 1/2001 | Sjoo et al. | 407/104 |
| 6,921,234 | B2 * | 7/2005 | Arvidsson et al. | 407/103 |
| 6,960,049 | B2 * | 11/2005 | Inayama | 407/103 |
| 7,121,771 | B2 * | 10/2006 | Englund | 407/103 |
| 7,201,545 | B2 | 4/2007 | Ejderklint | |
| 7,217,070 | B2 * | 5/2007 | Hecht | 408/154 |
| 7,387,474 | B2 | 6/2008 | Edler et al. | |
| 7,476,061 | B2 * | 1/2009 | Edler | 407/66 |
| 7,488,142 | B2 * | 2/2009 | Englund et al. | 407/107 |
| 7,645,100 | B2 * | 1/2010 | Andersson et al. | 407/66 |
| 7,819,610 | B2 * | 10/2010 | Wallstrom et al. | 407/113 |
| 8,313,270 | B2 * | 11/2012 | Hecht | 407/113 |
| D681,421 | S * | 5/2013 | Bucci | D8/354 |
| 8,821,079 | B2 * | 9/2014 | Hecht | 407/113 |
| 2002/0002886 | A1 * | 1/2002 | Hansson et al. | 82/161 |
| 2003/0017014 | A1 * | 1/2003 | Morgulis et al. | 407/34 |
| 2003/0219320 | A1 * | 11/2003 | Horiike et al. | 407/113 |
| 2004/0067112 | A1 * | 4/2004 | Blucher et al. | 407/103 |
| 2004/0265074 | A1 * | 12/2004 | Hessman et al. | 407/113 |
| 2006/0056926 | A1 * | 3/2006 | Riviere et al. | 407/40 |
| 2006/0140732 | A1 * | 6/2006 | Hecht et al. | 408/199 |
| 2006/0216121 | A1 * | 9/2006 | Edler et al. | 407/104 |
| 2007/0248425 | A1 * | 10/2007 | Andersson et al. | 407/113 |
| 2007/0274792 | A1 * | 11/2007 | Pantzar | 407/66 |
| 2007/0292220 | A1 * | 12/2007 | Sjoberg et al. | 407/66 |
| 2014/0030038 | A1 * | 1/2014 | Hansson | 408/199 |
| 2015/0016899 | A1 * | 1/2015 | Baernthaler | 407/11 |

FOREIGN PATENT DOCUMENTS

| | | |
|---|---|---|
| JP | 2007-075932 A | 3/2007 |
| JP | 2008-260090 A | 10/2008 |

* cited by examiner

RHOMBUS-SHAPED INDEXABLE CUTTING INSERT AND CUTTING TOOL

FIELD OF THE INVENTION

The present invention relates to a cutting tool and a cutting insert for use in metal cutting processes in general, and for turning operations in particular.

BACKGROUND OF THE INVENTION

Within the field of cutting tools used in turning operations, there are many examples of cutting inserts being removably secured in an insert receiving pocket of a tool holder. In some instances, these cutting tools are configured such that the co-operating surfaces of the cutting insert and the insert receiving pocket are formed with protrusions and recesses. In other instances, these cutting tools are configured such that the co-operating surfaces of the cutting insert and the insert receiving pocket are formed with male and female type mating elements.

U.S. Pat. No. 7,201,545 discloses a cutting tool having a holder, a shim and an indexable cutting insert. The shim, having a substantially rhomboidal shape with substantially parallel upper and lower sides, is mounted in a pocket of the holder. The cutting insert, having a substantially rhomboidal shape, in analogy with the shim, is mounted against the shim, whereby three out of six protrusions on a lower side of the cutting insert are in 'active' abutment with two support surfaces on the upper side of the shim, whilst two recesses on the upper side of the shim provide clearance for the other three 'passive' protrusions. Indexing the cutting insert by 180° results in the three 'active' protrusions becoming 'passive' and vice versa.

U.S. Pat. No. 7,387,474 discloses a cutting tool having a holder with an insert seat, and an indexable cutting insert, with a rhombic basic shape, mounted therein. The insert seat includes two male type engagement portions in the form of elongated ridges oriented at 90° to each other, and forming a T-shaped configuration. A bottom side of the cutting insert includes two sets of female type engagement portions, each set having two elongated grooves oriented at 90° to each other. In each index position of the cutting insert, one set is actively engaged with the two elongated ridges and the other set is inactive.

SUMMARY OF THE INVENTION

In accordance with the present invention, there is provided a generally rhombus-shaped indexable cutting insert comprising:
opposing upper and lower surfaces and a peripheral side surface extending therebetween, the peripheral side surface having alternating obtuse and acute corner surfaces separated by four relief surfaces;
a central axis passing through the upper and lower surfaces, about which central axis the cutting insert is indexable;
a minor vertical plane containing the central axis and intersecting the two obtuse corner surfaces; and
a nose cutting edge formed at the intersection of at least one of the upper and lower surfaces with each of the two acute corner surfaces,
at least one of the upper and lower surfaces comprising:
an engagement surface comprising a single primary engagement element and four secondary engagement elements,
the primary engagement element having an elongated pair of primary engagement flank surfaces and a primary engagement plane, the primary engagement element exhibiting mirror symmetry about the primary engagement plane,
each secondary engagement element including a secondary engagement portion, the secondary engagement portion having an elongated pair of secondary engagement flank surfaces and a secondary engagement plane, the secondary engagement portion exhibiting mirror symmetry about the secondary engagement plane,
wherein the primary engagement plane contains the central axis and intersects each nose cutting edge, and
wherein each secondary engagement plane does not contain the central axis and forms an acute engagement angle with the primary engagement plane.

Also in accordance with the present invention, there is provided a cutting tool comprising:
a tool holder having a main body with an insert receiving pocket formed in a front end thereof, and a cutting insert of the sort described above removably secured in the insert receiving pocket by means of a clamping member.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
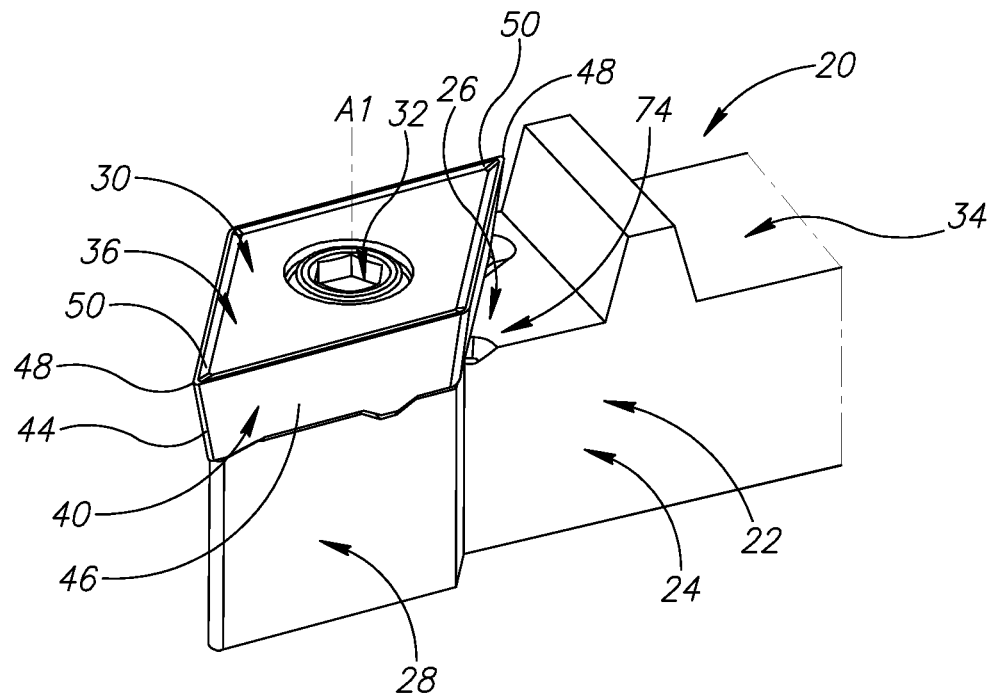
FIG. 1 is a perspective view of a cutting tool in accordance with some embodiments of the present invention.

The present invention relates to a cutting tool 20 comprising a tool holder 22 having a main body 24 with an insert receiving pocket 26 formed in a front end 28 thereof, and a generally rhombus-shaped indexable cutting insert 30, 30' removably secured in the insert receiving pocket 26 by means of a clamping member 32.

Figure 2:
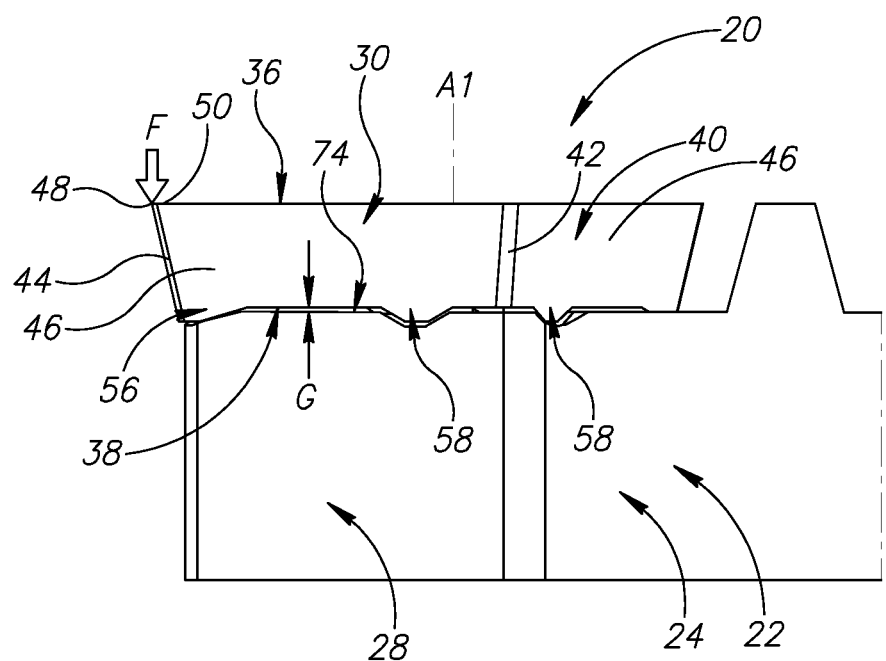
FIG. 2 is a side view of the cutting tool shown in FIG. 1.
Figure 3:
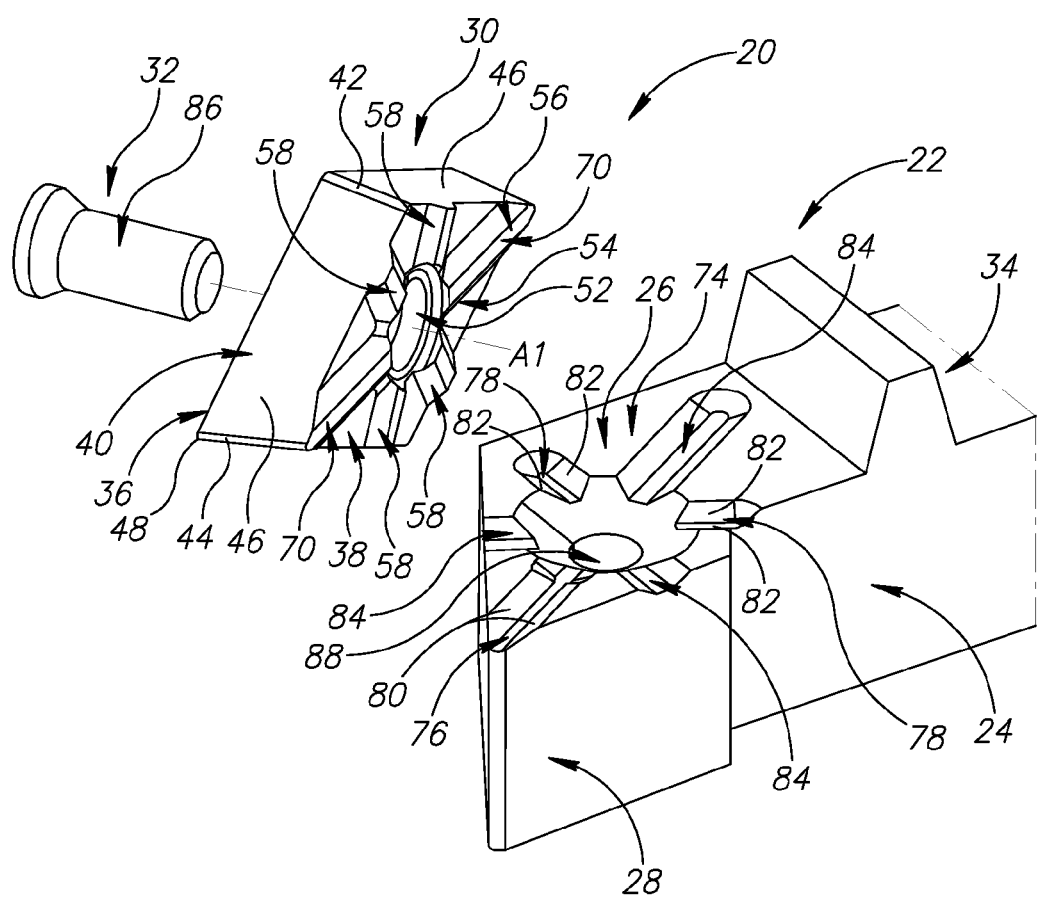
FIG. 3 is an exploded perspective view of the cutting tool shown in FIG. 1.

In some embodiments of the present invention, as shown in FIGS. 1 to 3, the cutting tool 20 may be in the form of a turning tool, having a holder shank 34 extending away from the front end 28 of the main body 24.

Also, in some embodiments of the present invention, the tool holder 22 may be manufactured from machined steel, and the cutting insert 30, 30' may preferably be manufactured by form pressing and sintering a cemented carbide, such as tungsten carbide, and may be coated or uncoated.

Figure 4:
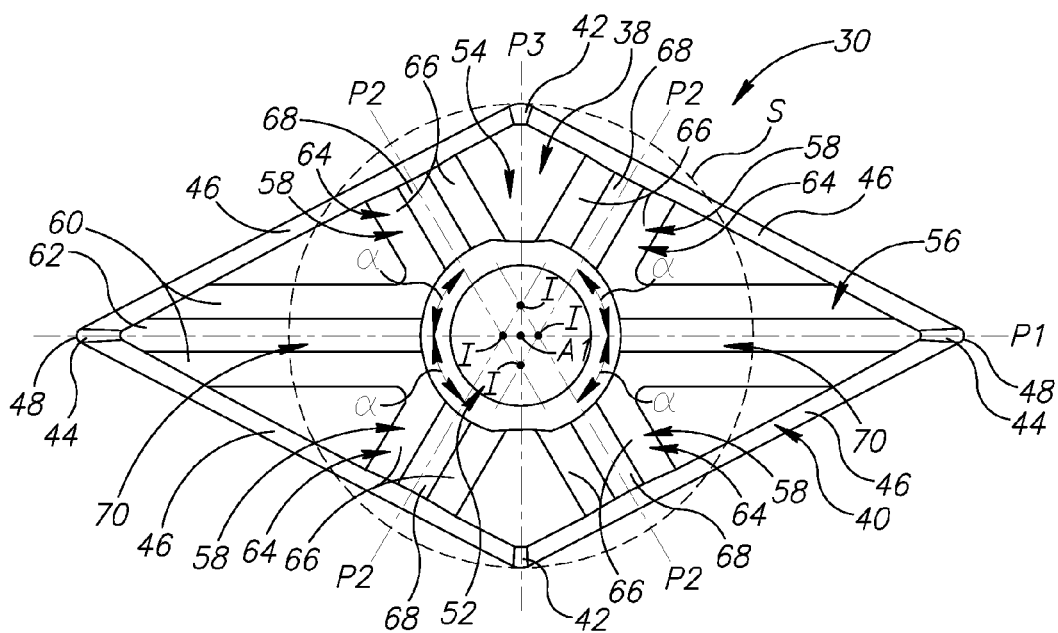
FIG. 4 is a bottom view of a 'single-sided' cutting insert in accordance with some embodiments of the present invention.
Figure 6:
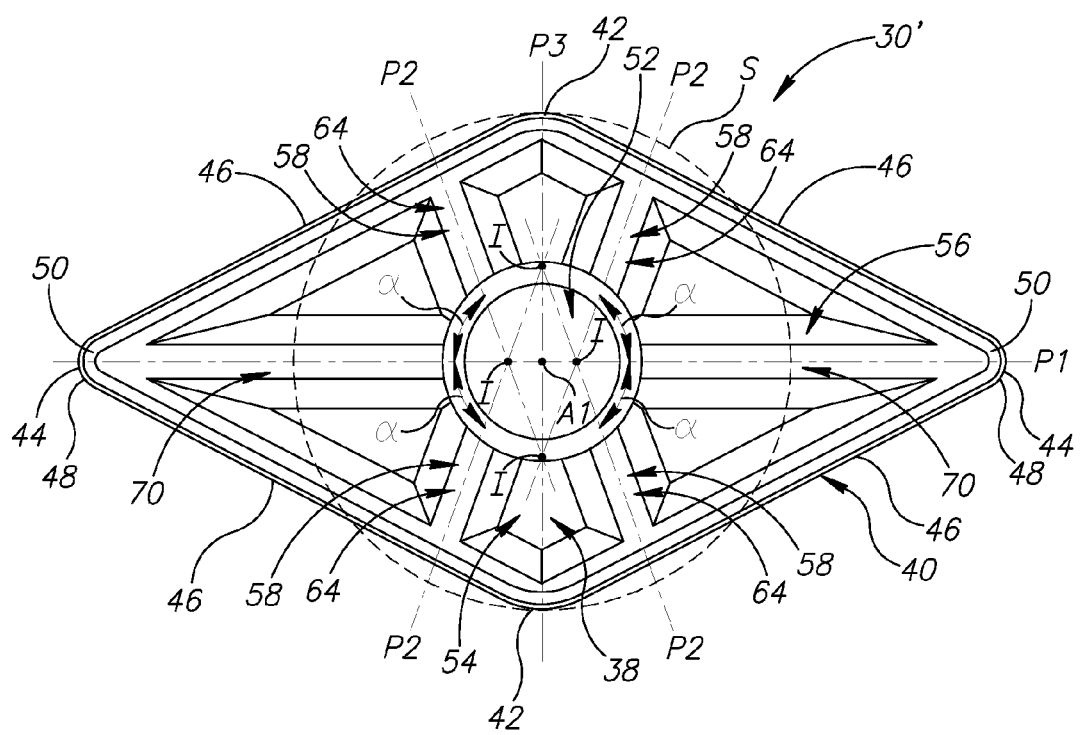
FIG. 6 is a bottom view of a 'double-sided' cutting insert in accordance with some embodiments of the present invention.

According to the present invention, as shown in FIGS. 1, 4 and 6, the generally rhombus-shaped cutting insert 30, 30' has opposing upper and lower surfaces 36, 38 and a peripheral side surface 40 extending therebetween, the peripheral side surface 40 having alternating obtuse and acute corner surfaces 42, 44 separated by four relief surfaces 46.

In some embodiments of the present invention, the four relief surfaces 46 may be planar.

Also according to the present invention, a nose cutting edge 48 is formed at the intersection of at least one of the upper and lower surfaces 36, 38 with each of the two acute corner surfaces 44.

In some embodiments of the present invention, as shown in FIGS. 1, 2 and 6, a rake surface 50 may be formed on at least one of the upper and lower surfaces 36, 38 adjacent each nose cutting edge 48.

According to the present invention, as shown in FIGS. 3, 4 and 6, a central axis A1 passes through the upper and lower surfaces 36, 38, about which central axis A1 the cutting insert 30, 30' is indexable.

In some embodiments of the present invention, as shown in FIGS. 4 and 6, a clamping bore 52 may extend co-axially with the central axis A1 and open out to at least one of the upper and lower surfaces 36, 38.

Also, in some embodiments of the present invention, the cutting insert 30, 30' may exhibit two-fold rotational symmetry about the central axis A1.

According to the present invention, as shown in FIGS. 3, 4 and 6, at least one of the upper and lower surfaces 36, 38 comprises an engagement surface 54 having five engagement ridges and/or grooves 56, 58, the five engagement ridges and/or grooves 56, 58 comprising a single primary engagement element 56 and four secondary engagement elements 58.

In some embodiments of the present invention, the engagement surface 54 may have exactly five engagement ridges and/or grooves 56, 58.

Also, in some embodiments of the present invention, when the cutting insert 30, 30' is viewed axially along the central axis A1, as shown in FIGS. 4 and 6, the four secondary engagement elements 58 may be entirely located inside an imaginary circle S circumscribing the two obtuse corner surfaces 42, and the primary engagement element 56 may intersect the imaginary circle S.

Further, in some embodiments of the present invention, only the lower surface 38 may comprise an engagement surface 54, and nose cutting edges 48 may only be formed at the intersection of the upper surface 36 with the two acute corner surfaces 44. For these 'single-sided' embodiments of the cutting insert 30, as shown in FIG. 4, the primary engagement element 56 of the lower surface 38 may intersect the two acute corner surfaces 44.

Also, for these 'single-sided' embodiments of the cutting insert 30, each of the four secondary engagement elements 58 of the lower surface 38 may intersect the peripheral side surface 40.

Further, for these 'single-sided' embodiments of the cutting insert 30, the cutting insert 30 may be described as 'positive', having four relief surfaces 46 inclined inwardly in a direction away from the upper surface 36.

Alternatively, in some embodiments of the present invention, as shown in FIG. 6, the cutting insert 30' may be 'double-sided', with nose cutting edges 48 being formed at the intersection of both the upper and lower surfaces 36, 38 with the two acute corner surfaces 44, and both the upper and lower surfaces 36, 38 comprising an engagement surface 54.

It should be appreciated that the 'double-sided' cutting insert 30', having a total of four nose cutting edges 48, provides greater economic efficiency.

Further, for these 'double-sided' embodiments of the cutting insert 30', the cutting insert 30' may be described as 'negative' or 'neutral', having four relief surfaces 46 parallel to the insert axis A1.

According to the present invention, as shown in FIGS. 4 and 6, the primary engagement element 56 has an elongated pair of primary engagement flank surfaces 60 and a vertically extending primary engagement plane P1. The primary engagement element 56 exhibits minor symmetry about the primary engagement plane P1.

In some embodiments of the present invention, the cutting insert 30, 30' may exhibit mirror symmetry about the primary engagement plane P1.

Also, in some embodiments of the present invention, the two surface components of the pair of primary engagement flank surfaces 60 may be separated by the primary engagement plane P1.

Further, in some embodiments of the present invention, the primary engagement element 56 may be V-shaped when viewed in a cross-section perpendicular to the primary engagement plane P1.

Yet further, in some embodiments of the present invention, the two surface components of the pair of primary engagement flank surfaces 60 may extend parallel to each other.

It should be appreciated that use of the term "V-shaped" throughout the description and claims, is not restricted to a pair of flank surfaces forming a 'V' shape and intersecting at a vertex point (when viewed in cross-section), but also accounts for an additional surface spacing apart the pair of flank surfaces.

In some embodiments of the present invention, the primary engagement element 56 may include a primary intermediate surface 62 spacing apart the pair of primary engagement flank surfaces 60.

According to the present invention, as shown in FIGS. 4 and 6, the primary engagement plane P1 contains the central axis A1 and intersects each nose cutting edge 48.

In some embodiments of the present invention, the primary engagement plane P1 may bisect each nose cutting edge 48, and each nose cutting edge 48 may exhibit mirror symmetry about the primary engagement plane P1.

According to the present invention, as shown in FIGS. 4 and 6, each secondary engagement element 58 includes a secondary engagement portion 64, where the secondary engagement portion 64 has an elongated pair of secondary engagement flank surfaces 66 and a vertically extending secondary engagement plane P2. The secondary engagement portion 64 exhibits mirror symmetry about the secondary engagement plane P2.

In some embodiments of the present invention, the two surface components of each pair of secondary engagement flank surfaces 66 may be separated by their respective secondary engagement plane P2.

Also, in some embodiments of the present invention, each secondary engagement element 58 may be V-shaped when viewed in a cross-section perpendicular to its respective secondary engagement plane P2.

Further, in some embodiments of the present invention, the two surface components of each pair of secondary engagement flank surfaces 66 may extend parallel to each other.

Yet further, in some embodiments of the present invention, each secondary engagement portion 64 may include a secondary intermediate surface 68 spacing apart its respective pair of secondary engagement flank surfaces 66.

In some embodiments of the present invention, the four secondary engagement portions 64 may be identical to each other.

Also, in some embodiments of the present invention, each secondary engagement plane P2 may be non-coplanar with the other three secondary engagement planes P2. However, pairs of secondary engagement portions 64 intersecting opposite relief surfaces 46 may be parallel to one another. This results in the four secondary engagement elements 58 constituting two pairs of parallel, offset secondary engagement elements 58, each pair having one member on either side of the primary engagement plane P1.

Further, in some embodiments of the present invention, as shown in FIGS. 4 and 6, each secondary engagement element 58 may be entirely located on one side of the primary engagement plane P1. For these embodiments of the present invention, two secondary engagement planes P2 of two secondary engagement elements 58 located on the same side of the primary engagement plane P1 may intersect at an intersection point I located on the opposite side of the primary engagement plane P1.

According to the present invention, a minor vertical plane P3 contains the central axis A1 and intersects the two obtuse corner surfaces 42.

In some embodiments of the present invention, the minor vertical plane P3 may bisect each obtuse corner surface 42, and each obtuse corner surface 42 may exhibit mirror symmetry about the minor vertical plane P3.

Also, in some embodiments of the present invention, the cutting insert 30, 30' may exhibit mirror symmetry about the minor vertical plane P3.

Further, in some embodiments of the present invention, as shown in FIGS. 4 and 6, each secondary engagement element 58 may be entirely located on one side of the minor vertical plane P3.

Yet further, in some embodiments of the present invention, as shown in FIGS. 4 and 6, the primary engagement element 56 may comprise two spaced apart primary engagement portions 70, and the two primary engagement portions 70 may be entirely located on opposite sides of the minor vertical plane P3. For these embodiments of the present invention, the two primary engagement portions 70 may be separated by the clamping bore 52.

According to the present invention, as shown in FIGS. 4 and 6, each secondary engagement plane P2 does not contain the central axis A1 and forms an acute engagement angle α with the primary engagement plane P1.

In some embodiments of the present invention, the four engagement angles α associated with the four secondary engagement planes P2 may have the same value.

Also, in some embodiments of the present invention, as shown in FIGS. 4 and 6, each secondary engagement plane P2 may intersect with exactly two other secondary engagement planes P2 to form total of four intersection points I when viewed axially along the central axis A1.

Figure 5:
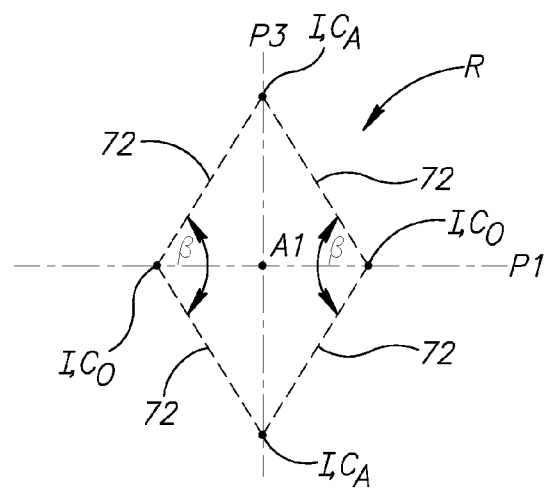
FIG. 5 is an imaginary four-sided polygon associated with the cutting insert shown in FIG. 4.

For embodiments of the present invention having four intersection points I, the four intersection points I may form four imaginary corners $C_A$, $C_O$ of an imaginary four-sided polygon R, as shown in FIG. 5.

For these 'imaginary four-sided polygon' embodiments of the present invention, the primary engagement plane P1 may contain two imaginary corners $C_O$ of the imaginary four-sided polygon R.

Also, for these 'imaginary four-sided polygon' embodiments of the present invention, the central axis A1 may be located at the center of the imaginary four-sided polygon R.

Further, for these 'imaginary four-sided polygon' embodiments of the present invention, the imaginary four-sided polygon R may be rhombus-shaped, having two diagonally opposed acute imaginary corners $C_A$ and two diagonally opposed obtuse imaginary corners $C_O$.

For these 'imaginary rhombus-shaped polygon' embodiments of the present invention, as shown in FIG. 5, at each obtuse imaginary corner $C_O$ two imaginary sides 72 of the imaginary four-sided polygon R may intersect to form an obtuse polygon angle β, and the primary engagement plane P1 may contain the two obtuse imaginary corners $C_O$.

The obtuse polygon angle β has a preferable range of 105°-135°.

According to the present invention, as shown in FIG. 3, the insert receiving pocket 26 comprises a support surface 74 having three support ridges and/or grooves 76, 78, the three support ridges and/or grooves 76, 78 comprising a single primary support element 76 and two secondary support elements 78.

Also, according to the present invention, either the upper or lower surface 36, 38 of the cutting insert 30, 30' is clamped against the support surface 74 of the insert receiving pocket 26 solely by:

the primary engagement element 56 making contact with the primary support element 76; and two of the four secondary engagement elements 58 making contact with the two secondary support elements 78.

In some embodiments of the present invention, as shown in FIG. 2, except for the contact between the engagement elements 56, 58 and the support elements 76, 78, a gap G is formed between the operative upper or lower surface 36, 38 and the support surface 74.

In some embodiments of the present invention, the primary engagement element 56 may make contact with the primary support element 76 at least outside the imaginary circle S of the cutting insert 30, 30'.

Also, in some embodiments of the present invention, where the primary engagement element 56 comprises two spaced apart primary engagement portions 70 located on opposite sides of the minor vertical plane P3, only the primary engagement portion 70 on the same side of the minor vertical plane P3 as the operative nose cutting edge 48 may make contact with the primary support element 76.

Further, in some embodiments of the present invention, the two operative secondary engagement elements 58, making contact with the two secondary support elements 78, may be entirely located on one side of the minor vertical plane P3, and the operative nose cutting edge 48 may be located on the other side of the minor vertical plane P3.

It should be appreciated that locating the two operative secondary engagement elements 58 on the opposite side of the minor vertical plane P3 from the operative primary engagement portion 70 evenly distributes the clamping force, applied by the clamping member 32, between these three components, and achieves stable three-point clamping.

Even distribution of the clamping force is also successfully achieved for embodiments of the present invention where the two operative secondary engagement elements 58 are located inside the the imaginary circle S and the operative primary engagement portion 70 makes contact with the primary support element 76 outside the imaginary circle S.

In some embodiments of the present invention, as shown in FIG. 2, the operative nose cutting edge 48 may be subject to a main cutting force F directed generally parallel to the central axis A1, when the cutting tool 20 is used to cut a workpiece.

Also, in some embodiments of the present invention, the pair of primary engagement flank surfaces 60 of the primary engagement element 56 may make contact with a corresponding pair of primary support flank surfaces 80 on the primary support element 76, and each pair of secondary engagement flank surfaces 66 of the two operative secondary engagement elements 58, making contact with the two secondary support elements 78, may make contact with a corresponding pair of secondary support flank surfaces 82 on one of the two secondary support elements 78.

It should be appreciated that by configuring the four secondary engagement elements 58 such that each secondary engagement plane P2 does not contain the central axis A1, but forms an acute engagement angle α with the primary engagement plane P1, the corresponding secondary support elements 78 advantageously provide good resistance to lateral cutting force components at the operative nose cutting edge 48 directed away from the central axis A1.

In some embodiments of the present invention, the primary and secondary engagement elements 56, 58 may be in the form of ridges, and the primary and secondary support elements 76, 78 may be in the form of grooves.

For embodiments of the present invention having the engagement surface 54 configured with primary and secondary engagement ridges 56, 58 and the support surface 74 configured with primary and secondary support grooves 76, 78, the support surface 74 also includes support recesses 84 to accommodate the non-operative engagement ridges 56, 58 and portions thereof, such that the non-operative engagement ridges 56, 58 and portions thereof make no contact with the support surface 74.

It should be appreciated that the support surface 74 being configured with primary and secondary support grooves 76, 78 and support recesses 84, enables the insert receiving pocket 26 to be manufactured with greater efficiency.

In some embodiments of the present invention, the clamping bore 52 may open out to both the upper and lower surfaces 36, 38, and the clamping member 32 may be in the form of a clamping screw 86 located in the clamping bore 52 and threadingly engaged in a threaded bore 88 in the support surface 74.

Also, in some embodiments of the present invention, the peripheral side surface 40 may not make contact with the insert receiving pocket 26.

What is claimed is:

1. A generally rhombus-shaped indexable cutting insert (30, 30') comprising:
    opposing upper and lower surfaces (36, 38) and a peripheral side surface (40) extending therebetween, the peripheral side surface (40) having alternating obtuse and acute corner surfaces (42, 44) separated by four relief surfaces (46);
    a central axis (A1) passing through the upper and lower surfaces (36, 38), about which central axis (A1) the cutting insert (30, 30') is indexable;
    a minor vertical plane (P3) containing the central axis (A1) and intersecting the two obtuse corner surfaces (42); and
    a nose cutting edge (48) formed at the intersection of at least one of the upper and lower surfaces (36, 38) with each of the two acute corner surfaces (44),
    at least one of the upper and lower surfaces (36, 38) comprising:
        an engagement surface (54) comprising a single primary engagement element (56) and four secondary engagement elements (58),
        the primary engagement element (56) having an elongated pair of primary engagement flank surfaces (60) and a primary engagement plane (P1), the primary engagement element (56) exhibiting mirror symmetry about the primary engagement plane (P1),
        each secondary engagement element (58) including a secondary engagement portion (64), the secondary engagement portion (64) having an elongated pair of secondary engagement flank surfaces (66) and a secondary engagement plane (P2), the secondary engagement portion (64) exhibiting mirror symmetry about the secondary engagement plane (P2),
    wherein the primary engagement plane (P1) contains the central axis (A1) and intersects each nose cutting edge (48),
    wherein each secondary engagement plane (P2) does not contain the central axis (A1) and forms an acute engagement angle (a) with the primary engagement plane (P1); and
    the primary engagement flank surfaces (56) are distinct from the secondary engagement flank surfaces (66).

2. The cutting insert (30, 30') according to claim 1, wherein when viewed axially along the central axis (A1):
    the four secondary engagement elements (58) are entirely located inside an imaginary circle (S) circumscribing the two obtuse corner surfaces (42), and
    the primary engagement element (56) intersects the imaginary circle (S).

3. The cutting insert (30, 30') according to claim 1, wherein each secondary engagement plane (P2) is non-coplanar with the other three secondary engagement planes (P2).

4. The cutting insert (30, 30') according to claim 1, wherein each of the engagement elements (56, 58) is a ridge or a groove, at least a portion of which exhibits mirror symmetry about a corresponding one of five engagement planes (P1, P2); and
    the five engagement planes (P1, P2) are non-coplanar with each other.

5. The cutting insert (30, 30') according to claim 1, wherein the operative nose cutting edge (48) is subject to a main cutting force (F) directed generally parallel to the central axis (A1), when the cutting insert (30, 30') is operatively secured in a cutting tool (20).

6. The cutting insert (30, 30') according to claim 1, wherein the four secondary engagement portions (64) are identical to each other.

7. The cutting insert (30, 30') according to claim 1, wherein the four engagement angles (α) associated with the four secondary engagement planes (P2) have the same value.

8. The cutting insert (30, 30') according to claim 1, wherein the primary engagement plane (P1) bisects each nose cutting edge (48), and wherein
    each nose cutting edge (48) exhibits mirror symmetry about the primary engagement plane (P1).

9. The cutting insert (30, 30') according to claim 1, wherein the cutting insert (30, 30') exhibits mirror symmetry about the primary engagement plane (P1).

10. The cutting insert (30, 30') according to claim 1, wherein the cutting insert (30, 30') exhibits two-fold rotational symmetry about the central axis (A1).

11. The cutting insert (30, 30') according to claim 1, wherein a rake surface (50) is formed on at least one of the upper and lower surfaces (36, 38) adjacent each nose cutting edge (48).

12. The cutting insert (30, 30') according to claim 1, wherein the primary engagement element (56) is V-shaped when viewed in a cross-section perpendicular to the primary engagement plane (P1) and each secondary engagement element (58) is V-shaped when viewed in a cross-section perpendicular to its respective secondary engagement plane (P2).

13. The cutting insert (30, 30') according to claim 1, wherein the primary engagement element (56) includes a primary intermediate surface (62) spacing apart the pair of primary engagement flank surfaces (60), and
    wherein each secondary engagement portion (64) includes a secondary intermediate surface (68) spacing apart its respective pair of secondary engagement flank surfaces (66).

14. The cutting insert (30, 30') according to claim 1, wherein the two surface components of the pair of primary engagement flank surfaces (60) extend parallel to each other, and
wherein the two surface components of each pair of secondary engagement flank surfaces (66) extend parallel to each other.

15. The cutting insert (30, 30') according to claim 1, wherein the two surface components of the pair of primary engagement flank surfaces (60) are separated by the primary engagement plane (P1), and
wherein the two surface components of each pair of secondary engagement flank surfaces (66) are separated by their respective secondary engagement plane (P2).

16. The cutting insert (30, 30') according to claim 1, wherein a clamping bore (52) extends co-axially with the central axis (A1) and opens out to at least one of the upper and lower surfaces (36, 38).

17. The cutting insert (30, 30') according to claim 1, wherein the cutting insert (30, 30') exhibits mirror symmetry about the minor vertical plane (P3).

18. The cutting insert (30, 30') according to claim 1, wherein each secondary engagement element (58) is entirely located on one side of the minor vertical plane (P3).

19. The cutting insert (30, 30') according to claim 1, wherein the primary engagement element (56) comprises two spaced apart primary engagement portions (70), and
wherein the two primary engagement portions (70) are entirely located on opposite sides of the minor vertical plane (P3).

20. The cutting insert (30, 30') according to claim 1, wherein each secondary engagement element (58) is entirely located on one side of the primary engagement plane (P1).

21. The cutting insert (30, 30') according to claim 20, wherein two secondary engagement planes (P2) of two secondary engagement elements (58) located on the same side of the primary engagement plane (P1) intersect at an intersection point (I) located on the opposite side of the primary engagement plane (P1).

22. The cutting insert (30, 30') according to claim 1, wherein each secondary engagement plane (P2) intersects with exactly two other secondary engagement planes (P2) to form total of four intersection points (I) when viewed axially along the central axis (A1).

23. The cutting insert (30, 30') according to claim 22, wherein the four intersection points (I) form four imaginary corners ($C_A$, $C_O$) of an imaginary four-sided polygon (R).

24. The cutting insert (30, 30') according to claim 23, wherein the primary engagement plane (P1) contains two imaginary corners ($C_O$) of the imaginary four-sided polygon (R).

25. The cutting insert (30, 30') according to claim 23, wherein the central axis (A1) is located at the center of the imaginary four-sided polygon (R).

26. The cutting insert (30, 30') according to claim 23, wherein the imaginary four-sided polygon (R) is rhombus-shaped, having two diagonally opposed acute imaginary corners ($C_A$) and two diagonally opposed obtuse imaginary corners ($C_O$).

27. The cutting insert (30, 30') according to claim 26, wherein at each obtuse imaginary corner ($C_O$), two imaginary sides (72) of the imaginary four-sided polygon (R) intersect to form an obtuse polygon angle ($\beta$), and
wherein the primary engagement plane (P1) contains the two obtuse imaginary corners ($C_O$).

28. The cutting insert (30, 30') according to claim 27, wherein the obtuse polygon angle ($\beta$) has a range of 105°-135°.

29. The cutting insert (30) according to claim 1, wherein only the lower surface (38) comprises an engagement surface (54) and nose cutting edges (48) are only formed at the intersection of the upper surface (36) with the two acute corner surfaces (44), and
wherein the primary engagement element (56) of the lower surface (38) intersects the two acute corner surfaces (44).

30. The cutting insert (30') according to claim 29, wherein each of the four secondary engagement elements (58) of the lower surface (38) intersect the peripheral side surface (40).

31. The cutting insert (30') according to claim 1, wherein nose cutting edges (48) are formed at the intersection of both the upper and lower surfaces (36, 38) with the two acute corner surfaces (44), and
wherein both the upper and lower surfaces (36, 38) comprise an engagement surface (54).

32. A cutting tool (20) comprising:
a tool holder (22) having a main body (24) with an insert receiving pocket (26) formed in a front end (28) thereof, and a cutting insert (30, 30') in accordance with claim 1 removably secured in the insert receiving pocket (26) by means of a clamping member (32), the cutting insert (30, 30') having an operative nose cutting edge (48).

33. The cutting tool (20) according to claim 32, wherein the operative nose cutting edge (48) is subject to a main cutting force (F) directed generally parallel to the central axis (A1), when the cutting tool (20) is used to cut a workpiece.

34. The cutting tool (20) according to claim 32, wherein:
the insert receiving pocket (26) comprises:
a support surface (74) comprising a single primary support element (76) and two secondary support elements (78),
wherein the cutting insert (30, 30') is clamped against the support surface (74) of the insert receiving pocket (26) solely by:
the primary engagement element (56) making contact with the primary support element (76), and
two of the four secondary engagement elements (58) are operative, making contact with the two secondary support elements (78).

35. The cutting tool (20) according to claim 34, wherein:
the primary and secondary engagement elements (56, 58) are ridges, and
wherein the primary and secondary support elements (76, 78) are grooves.

36. The cutting tool (20) according to claim 34, wherein the pair of primary engagement flank surfaces (60) of the primary engagement element (56) makes contact with a corresponding pair of primary support flank surfaces (80) on the primary support element (76), and
wherein each pair of secondary engagement flank surfaces (66) of the two operative secondary engagement elements (58) makes contact with a corresponding pair of secondary support flank surfaces (82) on one of the two secondary support elements (78).

37. The cutting tool (20) according to claim 34, wherein the two operative secondary engagement elements (58) are entirely located on one side of the minor vertical plane (P3) and the operative nose cutting edge (48) is located on the other side of the minor vertical plane (P3).

38. The cutting tool (20) according to claim 34, wherein the primary engagement element (56) comprises two spaced apart primary engagement portions (70), the two primary engagement portions (70) entirely located on opposite sides of the minor vertical plane (P3), and wherein only the primary engagement portion (70) on the same side of the minor vertical plane (P3) as the operative nose cutting edge (48) makes contact with the primary support element (76).

39. The cutting tool (20) according to claim 34, wherein the four secondary engagement elements (58) are entirely located inside an imaginary circle (S) circumscribing the two obtuse corner surfaces (42), and wherein the primary engagement element (56) makes contact with the primary support element (76) at least outside the imaginary circle (S).

40. The cutting tool (20) according to claim 34, wherein a clamping bore (52) extends co-axially with the central axis (A1) and opens out to both the upper and lower surfaces (36, 38), and wherein the clamping member (32) is in the form of a clamping screw (86) located in the clamping bore (52), the clamping screw (86) threadingly engaged in a threaded bore (88) in the support surface (74).

41. The cutting tool (20) according to claim 32, wherein the peripheral side surface (40) makes no contact with the insert receiving pocket (26).

42. A generally rhombus-shaped indexable cutting insert (30, 30') comprising:

opposing upper and lower surfaces (36, 38) and a peripheral side surface (40) extending therebetween, the peripheral side surface (40) having alternating obtuse and acute corner surfaces (42, 44) separated by four relief surfaces (46);

a central axis (A1) passing through the upper and lower surfaces (36, 38), about which central axis (A1) the cutting insert (30, 30') is indexable;

a minor vertical plane (P3) containing the central axis (A1) and intersecting the two obtuse corner surfaces (42); and a nose cutting edge (48) formed at the intersection of at least one of the upper and lower surfaces (36, 38) with each of the two acute corner surfaces (44), at least one of the upper and lower surfaces (36, 38) comprising:

an engagement surface (54) comprising a single primary engagement element (56) and four secondary engagement elements (58), the primary engagement element (56) extending along a primary engagement plane (P1) which contains the central axis (A1) and intersects each nose cutting edge (48), the primary engagement element (56) exhibiting mirror symmetry about the primary engagement plane (P1), and the four secondary engagement elements (58) constituting two secondary engagement elements (58) on either side of the primary engagement plane (P1), each secondary engagement element (58) comprising a pair of parallel secondary engagement flank surfaces (66), none of the secondary engagement flank surfaces being coplanar with one another.

* * * * *